(12) United States Patent
Smith (10) Patent No.: US 7,959,203 B2
(45) Date of Patent: Jun. 14, 2011

(54) VEHICLE TAILGATE ENCLOSURE WITH ENHANCED ADJUSTMENT

(75) Inventor: Anthony Smith, Costa Mesa, CA (US)

(73) Assignee: 89908, Inc., Irvine, CA (US)

( * ) Notice: Subject to any disclaimer, the term of this patent is extended or adjusted under 35 U.S.C. 154(b) by 140 days.

(21) Appl. No.: 12/251,847

(22) Filed: Oct. 15, 2008

(65) Prior Publication Data

US 2009/0108612 A1    Apr. 30, 2009

Related U.S. Application Data (60) Provisional application No. 61/000,930, filed on Oct. 29, 2007.

(51) Int. Cl.
*B62D 33/03* (2006.01)

(52) U.S. Cl. ............ 296/50; 296/26.08; 296/26.11

(58) Field of Classification Search ............ 296/26.08, 296/26.1, 51, 57.1, 26.01, 26.11, 37.6, 50
See application file for complete search history.

(56) References Cited

U.S. PATENT DOCUMENTS

| | | | |
|---|---|---|---|
| 171,736 A | 1/1876 | Mooney | |
| 341,307 A | 5/1886 | Altschwager | |
| 600,898 A | 3/1898 | Smith | |
| 1,242,035 A | 10/1917 | Pierson et al. | |
| 1,266,521 A | 5/1918 | Norquist | |
| 1,272,620 A | 7/1918 | Carlson | |
| 1,289,997 A | 12/1918 | Wyeth | |
| 1,655,777 A | 1/1928 | Weiland | |
| 1,655,797 A | 1/1928 | Peck | |
| 1,764,615 A | 6/1930 | Edwards | |
| 1,812,580 A | 6/1931 | Black | |
| 2,514,466 A | 7/1950 | Bildhauer | |
| D160,213 S | 9/1950 | Samuelson | |
| 2,621,357 A | 12/1952 | Stuman | |
| 2,626,179 A | 1/1953 | Gonzalez | |
| RE23,814 E | 4/1954 | Ingram | |
| 2,713,897 A | 7/1955 | Teague et al. | |

(Continued)

FOREIGN PATENT DOCUMENTS

RU    0629098    9/1978

OTHER PUBLICATIONS

Complaint, *Ford Motor Company v. 89908, Inc.* d/b/a AMP Research and/or American Moto Products Research, Case No. 2:06-cv-13316, U.S. District Court for the Eastern District of Michigan, Southern Division, filed Jul. 21, 2006.

(Continued)

*Primary Examiner* — Glenn Dayoan
*Assistant Examiner* — Gregory Blankenship
(74) *Attorney, Agent, or Firm* — Knobbe, Martens, Olson & Bear, LLP (57) ABSTRACT

A vehicle tailgate enclosure can be adapted for rapid assembly and adjustable width. The enclosure includes two side sections and a center section. The center section is formed as an assembly of two portions. The side sections can each comprise beams which are advanced into recesses of the center section and retained. The width of the tailgate enclosure can be adjusted by the depth of advancement of the beams into the recesses of the center section. The center section can be constructed of a plastic material while the side sections can be metallic, thus leading to cost and weight savings. The tailgate enclosure can be easily and rapidly assembled by hand using a single tool.

5 Claims, 12 Drawing Sheets

U.S. PATENT DOCUMENTS

| | | | |
|---|---|---|---|
| 2,720,414 A | 10/1955 | Hart | |
| 2,795,363 A | 6/1957 | Turner | |
| 2,797,959 A | 7/1957 | Brice | |
| 2,872,239 A | 2/1959 | Bowness et al. | |
| 2,874,885 A | 2/1959 | Young | |
| 3,656,801 A | 4/1972 | Doutt et al. | |
| 3,734,560 A | 5/1973 | Cramblet | |
| 3,902,599 A | 9/1975 | Stromberg | |
| 4,023,850 A | 5/1977 | Tillery | |
| 4,063,774 A | 12/1977 | Hanks | |
| 4,132,335 A | 1/1979 | Ingram | |
| 4,136,905 A | 1/1979 | Morgan | |
| 4,295,587 A | 10/1981 | Bott | |
| D266,836 S | 11/1982 | Ingram | |
| D267,247 S | 12/1982 | Kowalski et al. | |
| 4,419,794 A | 12/1983 | Horton, Jr. et al. | |
| 4,451,075 A | 5/1984 | Canfield | |
| 4,470,716 A | 9/1984 | Welch | |
| 4,472,639 A | 9/1984 | Bianchi | |
| 4,531,773 A | 7/1985 | Smith | |
| 4,585,263 A | 4/1986 | Hesner | |
| 4,596,417 A | 6/1986 | Bennett | |
| 4,635,992 A | 1/1987 | Hamilton et al. | |
| 4,652,035 A | 3/1987 | Austin, Jr. | |
| 4,659,136 A | 4/1987 | Martin et al. | |
| D291,789 S | 9/1987 | Noga | |
| D294,137 S | 2/1988 | Robson | |
| 4,749,226 A | 6/1988 | Heft | |
| 4,750,773 A | 6/1988 | Chapline et al. | |
| 4,770,458 A | 9/1988 | Burke et al. | |
| 4,778,213 A | 10/1988 | Palmer | |
| 4,786,119 A | 11/1988 | Smuda | |
| D300,734 S | 4/1989 | Kruitbosch | |
| 4,824,158 A | 4/1989 | Peters et al. | |
| 4,828,312 A | 5/1989 | Kinkel et al. | |
| 4,830,242 A | 5/1989 | Painter | |
| 4,875,724 A | 10/1989 | Gruber | |
| D305,111 S | 12/1989 | Zagner | |
| 5,024,409 A | 6/1991 | Bohnen | |
| 5,037,152 A | 8/1991 | Hendricks | |
| 5,037,153 A | 8/1991 | Stark | |
| D321,496 S | 11/1991 | Sparham et al. | |
| 5,083,829 A | 1/1992 | Fonseca | |
| D326,076 S | 5/1992 | Wiese | |
| 5,114,203 A | 5/1992 | Carnes | |
| 5,123,691 A | 6/1992 | Ginn | |
| 5,127,697 A | 7/1992 | St. Marie | |
| 5,129,665 A | 7/1992 | Sutter et al. | |
| 5,147,103 A | 9/1992 | Ducote | |
| 5,154,470 A | 10/1992 | Bringman, Jr. | |
| 5,169,200 A | 12/1992 | Pugh | |
| 5,170,746 A | 12/1992 | Roose | |
| 5,201,532 A | 4/1993 | Salesky et al. | |
| 5,201,562 A | 4/1993 | Dorsey | |
| 5,253,913 A | 10/1993 | Metivier | |
| 5,299,773 A | 4/1994 | Bertrand | |
| 5,310,155 A | 5/1994 | Wu | |
| 5,396,915 A | 3/1995 | Bomar | |
| D360,614 S | 7/1995 | Alcocer | |
| 5,441,324 A | 8/1995 | Gold | |
| 5,456,511 A | 10/1995 | Webber | |
| 5,468,038 A | 11/1995 | Sauri | |
| D365,323 S | 12/1995 | Napierkowski et al. | |
| 5,588,630 A | 12/1996 | Chen-Chao | |
| 5,622,296 A | 4/1997 | Pirhonen et al. | |
| 5,658,033 A | 8/1997 | Delaune | |
| 5,685,686 A | 11/1997 | Burns | |
| 5,700,047 A * | 12/1997 | Leitner et al. | 296/26.11 |
| 5,730,342 A | 3/1998 | Tien | |
| 5,743,589 A | 4/1998 | Felker | |
| D394,639 S | 5/1998 | Carter | |
| 5,752,800 A | 5/1998 | Brincks et al. | |
| 5,755,480 A | 5/1998 | Bryan | |
| 5,765,892 A | 6/1998 | Covington | |
| 5,775,759 A | 7/1998 | Cummins | |
| 5,788,311 A | 8/1998 | Tibbals | |
| D398,284 S | 9/1998 | Carter et al. | |
| 5,806,907 A | 9/1998 | Martinus et al. | |
| D399,481 S | 10/1998 | Larson et al. | |
| 5,820,188 A | 10/1998 | Nash | |
| 5,823,596 A | 10/1998 | Kulesza | |
| 5,839,614 A | 11/1998 | Brown | |
| 5,853,116 A | 12/1998 | Schreiner | |
| 5,857,724 A | 1/1999 | Jarman | |
| 5,862,964 A | 1/1999 | Moliner | |
| D410,429 S | 6/1999 | Derecktor | |
| 5,911,464 A | 6/1999 | White | |
| 5,924,614 A | 7/1999 | Kuntze et al. | |
| D417,859 S | 12/1999 | Leitner et al. | |
| D418,106 S | 12/1999 | Leitner et al. | |
| 5,997,066 A | 12/1999 | Scott | |
| 6,019,410 A | 2/2000 | Trostle et al. | |
| 6,082,801 A | 7/2000 | Owen et al. | |
| 6,102,265 A | 8/2000 | Stapleton | |
| 6,112,964 A | 9/2000 | Cucheran et al. | |
| 6,113,173 A | 9/2000 | Leitner et al. | |
| 6,120,076 A | 9/2000 | Adsit et al. | |
| 6,123,305 A | 9/2000 | Lukasavitz | |
| 6,149,219 A | 11/2000 | Schambre et al. | |
| 6,227,593 B1 | 5/2001 | De Valcourt | |
| 6,257,637 B1 | 7/2001 | Reed | |
| 6,269,990 B1 | 8/2001 | Gray | |
| 6,283,525 B1 | 9/2001 | Morse | |
| 6,338,515 B1 | 1/2002 | Munhall | |
| 6,340,190 B1 * | 1/2002 | Rosebrugh et al. | 296/26.11 |
| 6,378,926 B1 | 4/2002 | Renze et al. | |
| 6,390,427 B1 | 5/2002 | McConnell et al. | |
| 6,402,215 B1 | 6/2002 | Leitner et al. | |
| 6,422,627 B1 | 7/2002 | Kuhn et al. | |
| 6,425,618 B1 * | 7/2002 | Garland et al. | 296/3 |
| 6,454,338 B1 | 9/2002 | Glickman et al. | |
| 6,471,277 B1 | 10/2002 | Scensny et al. | |
| 6,494,520 B2 | 12/2002 | Brzenchek et al. | |
| 6,513,688 B2 | 2/2003 | Kimita et al. | |
| 6,540,123 B1 | 4/2003 | Kmita et al. | |
| 6,550,841 B1 | 4/2003 | Burdon et al. | |
| 6,557,918 B2 | 5/2003 | Iafrate et al. | |
| 6,561,560 B2 | 5/2003 | Brown et al. | |
| 6,598,922 B2 | 7/2003 | Morse et al. | |
| 6,607,228 B2 | 8/2003 | Carter, III et al. | |
| 6,626,478 B1 | 9/2003 | Minton | |
| 6,676,182 B2 | 1/2004 | Fitts | |
| 6,719,261 B2 | 4/2004 | Wadsworth | |
| 6,719,345 B2 * | 4/2004 | Ootsuka et al. | 296/26.08 |
| 6,805,392 B2 | 10/2004 | Leitner et al. | |
| 6,889,878 B2 | 5/2005 | Parsons | |
| 6,918,624 B2 | 7/2005 | Miller et al. | |
| 6,923,488 B2 | 8/2005 | Bruford et al. | |
| 6,948,763 B2 | 9/2005 | Robbins | |
| 6,966,595 B2 | 11/2005 | Bruford et al. | |
| 6,983,972 B2 | 1/2006 | Tan et al. | |
| 6,994,389 B1 * | 2/2006 | Graffy et al. | 296/26.11 |
| 7,007,995 B1 | 3/2006 | Scarberry et al. | |
| 7,063,366 B2 | 6/2006 | Leitner et al. | |
| 7,093,870 B2 | 8/2006 | Kim et al. | |
| 7,111,886 B1 | 9/2006 | Miller et al. | |
| 7,121,604 B2 * | 10/2006 | Reed | 296/26.11 |
| 7,152,902 B2 | 12/2006 | Moen et al. | |
| 7,175,218 B1 * | 2/2007 | Keene | 296/26.08 |
| 7,195,432 B2 * | 3/2007 | Earle et al. | 410/94 |
| D544,826 S * | 6/2007 | Smith et al. | D12/414 |
| 7,229,116 B1 | 6/2007 | Bruford et al. | |
| 7,240,940 B2 | 7/2007 | Leitner | |
| 7,267,387 B1 | 9/2007 | Bruford et al. | |
| D553,072 S * | 10/2007 | Smith et al. | D12/414 |
| 7,347,473 B2 | 3/2008 | Miller et al. | |
| D568,230 S | 5/2008 | Smith | |
| 7,393,035 B2 | 7/2008 | Leitner et al. | |
| 7,413,231 B1 * | 8/2008 | Wood et al. | 296/26.11 |
| 7,464,976 B2 | 12/2008 | Smith | |
| 7,488,021 B1 | 2/2009 | Roos et al. | |
| 7,547,054 B2 | 6/2009 | Leitner | |
| D597,924 S | 8/2009 | Smith | |
| 7,654,598 B2 | 2/2010 | Lietner et al. | |
| 7,654,599 B2 * | 2/2010 | Stewart et al. | 296/26.11 |
| 7,681,935 B2 * | 3/2010 | Lietner et al. | 296/26.08 |
| 2002/0000732 A1 | 1/2002 | Sanders | |

| | | |
|---|---|---|
| 2002/0096901 A1 | 7/2002 | Lafrate et al. |
| 2002/0153737 A1 | 10/2002 | Fitts |
| 2003/0111858 A1 | 6/2003 | Carter, III et al. |
| 2003/0116986 A1 | 6/2003 | Ootsuka et al. |
| 2004/0074939 A1 | 4/2004 | Aftanas et al. |
| 2004/0080174 A1 | 4/2004 | Buelna |
| 2004/0134953 A1 | 7/2004 | Perez |
| 2005/0077747 A1 | 4/2005 | De Gaillard et al. |
| 2006/0091170 A1 | 5/2006 | Almhil |
| 2006/0213941 A1 | 9/2006 | Sweeney |
| 2006/0283900 A1 | 12/2006 | Stapleton |
| 2007/0132263 A1 | 6/2007 | Smith |
| 2007/0170739 A1 | 7/2007 | Sims |
| 2008/0012373 A1 | 1/2008 | Leitner |
| 2008/0111390 A1 | 5/2008 | Smith |
| 2008/0284190 A1 | 11/2008 | Leitner et al. |
| 2009/0108612 A1 | 4/2009 | Smith |
| 2009/0250957 A1 | 10/2009 | Leitner |

OTHER PUBLICATIONS

Defendant's Opposition to Plaintiffs Motion for Relief from Judgment filed on Sep. 15, 2009, *E-Z Load Gate, Inc. v. American Moto Products, Inc.* et al, Case No. 6:07-cv-01962, U.S. District Court, Middle District of Florida, filed Oct. 6, 2009.

Defendant's Motion for Summary Judgment, filed on Jan. 14, 2010, *89908, Inc. d/b/a AMP Research v. E-Z Load Gate, Inc.*, Case No. 2:08-cv-01515, U.S. District Court, District of Nevada, filed Nov. 14, 2008.

Affidavit of Stephen Earle in Support of Defendant's Motion for Summary Judgment, filed on Jan. 14, 2010, *89908, Inc. d/b/a Amp Research v. E-Z Load Gate, Inc.*, Case No. 2:08-cv-01515, U.S. District Court, District of Nevada, filed Nov. 14, 2008.

Affidavit of Floyd Jacobs in Support of Defendant's Motion for Summary Judgment, filed on Jan. 14, 2010, *89908, Inc. d/b/a AMP Research v. E-Z Load Gate, Inc.*, Case No. 2:08-cv-01515, U.S. District Court, District of Nevada, filed Nov. 14, 2008.

Final Consent Judgment and Permanent Injunction, filed on Jan. 29, 2010, *89908, Inc., d/b/a AMP Research v. E-Z Load Gate, Inc.*, Case No. 2:08-cv-01515-LDG-(PAL), U.S. District Court, District of Nevada, filed Nov. 14, 2008.

Defendant's Motion to Dismiss, alternatively, Motion to Transfer, filed on filed on Dec. 9, 2009, *89908, Inc. d/b/a AMP Research v. E-Z Load Gate, Inc.*, Case No. 2:09-cv-02165-PMP-PAL; U.S. District Court, District of Nevada, filed Nov. 4, 2008.

Plaintiffs Opposition to Defendant's Motion to Dismiss, alternatively, Motion to Transfer, filed on Dec. 28, 2009, *89908, Inc. d/b/a AMP Research v. E-Z Load Gate, Inc.*, Case No. 2:09-cv-02165-PMP-PAL; U.S. District Court, District of Nevada, filed Nov. 4, 2008.

Order Denying Motion to Dismiss, alternatively, Motion to Transfer, issued on Jan. 14, 2010, *89908, Inc. d/b/a AMP Research v. E-Z Load Gate, Inc.*, Case No. 2:09-cv-02165-PMP-PAL; U.S. District Court, District of Nevada, filed Nov. 4, 2008.

Defendant's Motion to Dismiss or Stay Case, filed on Dec. 7, 2009, *E-Z Load Gate, Inc. v. 89908, Inc. d/b/a AMP Research*, Case No. 2009-CA-9453-15-K, Circuit Court Eighteenth Judicial Circuit, Seminole County, Florida, filed Nov. 10, 2009.

Summons and Complaint, *EZ Load Gate, Inc. v. 89908, Inc. d/b/a/ AMP Research*, Case No. 2009-CA94353-15-K, In the Circuit Court, Eighteenth Judicial Circuit, Seminole County, Florida, filed Nov. 10, 2009.

Complaint, *89908, Inc. d/b/a AMP Research v. E-Z Load Gate, Inc.*, Case No. 2:09-cv-02165, United States District Court for the District of Nevada, filed Nov. 11, 2009.

Order Denying Motion to Enforce Judgment and Motion for Relief for Judgment, *E-Z Load Gate, Inc. v. American Moto Products, Inc.* et al, Case No. 6:07-cv-01962, U.S. District Court, Middle District of Florida, filed Oct. 6, 2009.

U.S. Appl. No. 11/924,537, filed Oct. 25, 2007, titled Vehicle Cargo Tailgate Enclosure.

U.S. Appl. No. 12/724,374, filed Mar. 15, 2010, titled Vehicle Cargo Bed Extender.

* cited by examiner

VEHICLE TAILGATE ENCLOSURE WITH ENHANCED ADJUSTMENT

CROSS-REFERENCE TO RELATED APPLICATIONS

This application is related to and claims priority to U.S. Provisional Patent Application No. 61/000,930, entitled "VEHICLE TAILGATE ENCLOSURE WITH ENHANCED ADJUSTMENT," filed on Oct. 29, 2007, the entire application of which is hereby incorporated by reference.

BACKGROUND OF THE INVENTION

1. Field of the Invention

The present application generally relates to a cargo tailgate enclosure for a pickup truck.

2. Description of the Related Art

Pick-up trucks are extremely popular. One of their primary advantages is the ability to haul loads in the storage bed located behind the cab of the vehicle. Unfortunately, often the storage bed is of an undesirable configuration for the load being transported. In particular, it is not unusual for the load to be larger than the truck bed, so that the tailgate of the truck needs to be lowered to enable the load to be adequately transferred. Unfortunately, this raises the risk that the load will fall out of the back of the truck, or that the load will need to be tied down, taking additional time.

For this reason, various truck tailgate enclosures have been developed. Despite the great success and excellent functionality of previous tailgate enclosures, new areas exist in which to further improve the cargo tailgate enclosure.

SUMMARY OF THE INVENTION

In some embodiments, a vehicle tailgate enclosure is configured to couple to a vehicle bed having a first side wall, a second side wall and a tailgate. The tailgate enclosure comprises a first side section or panel, a second side section or panel, and a center section or panel. The first side panel is desirably configured to couple to the first side wall of the vehicle bed. The second side panel is desirably configured to couple to the second side wall of the vehicle bed. The center panel is desirably configured to removably couple to the first side panel and the second side panel and to allow adjustable spacing therebetween.

In other embodiments, a vehicle tailgate enclosure is configured to couple to a vehicle bed having a first side wall, a second side wall and a tailgate. The tailgate enclosure comprises a first side section or panel, a second side section or panel, and a center section or panel. The first side panel is composed of a first material. The second side panel is composed of the first material. The center panel extends between the first side panel and the second side panel. The center panel is composed of a second material different from the first material. The center panel is removably connected to the first and second side panels.

In other embodiments, a tailgate enclosure comprises a first side section or panel, a second side section or panel, and a center section or panel. The first side panel comprises a plurality of beams. The second side panel comprises a plurality of beams. The center panel is configured to extend between the first side panel and the second side panel. The center panel comprises a first portion and a second portion. The second portion is configured to couple to the first portion. The coupling of the first portion and the second portion defines a plurality of recesses, each recess configured to receive one of the plurality of beams of the first and the second side panels.

In other embodiments, a method of assembling a vehicle tailgate enclosure is provided. The method comprises assembling a center section or panel of the vehicle tailgate enclosure; advancing a plurality of beams of a first side section or panel into a corresponding plurality of recesses in the center panel; advancing a plurality of beams of a second side section or panel into a corresponding plurality of recesses in the center panel; and restraining the beams of the first side panel and the second side panel with respect to the center panel.

DETAILED DESCRIPTION OF THE PREFERRED EMBODIMENT

Vehicle Tailgate Enclosure

Figure 1:
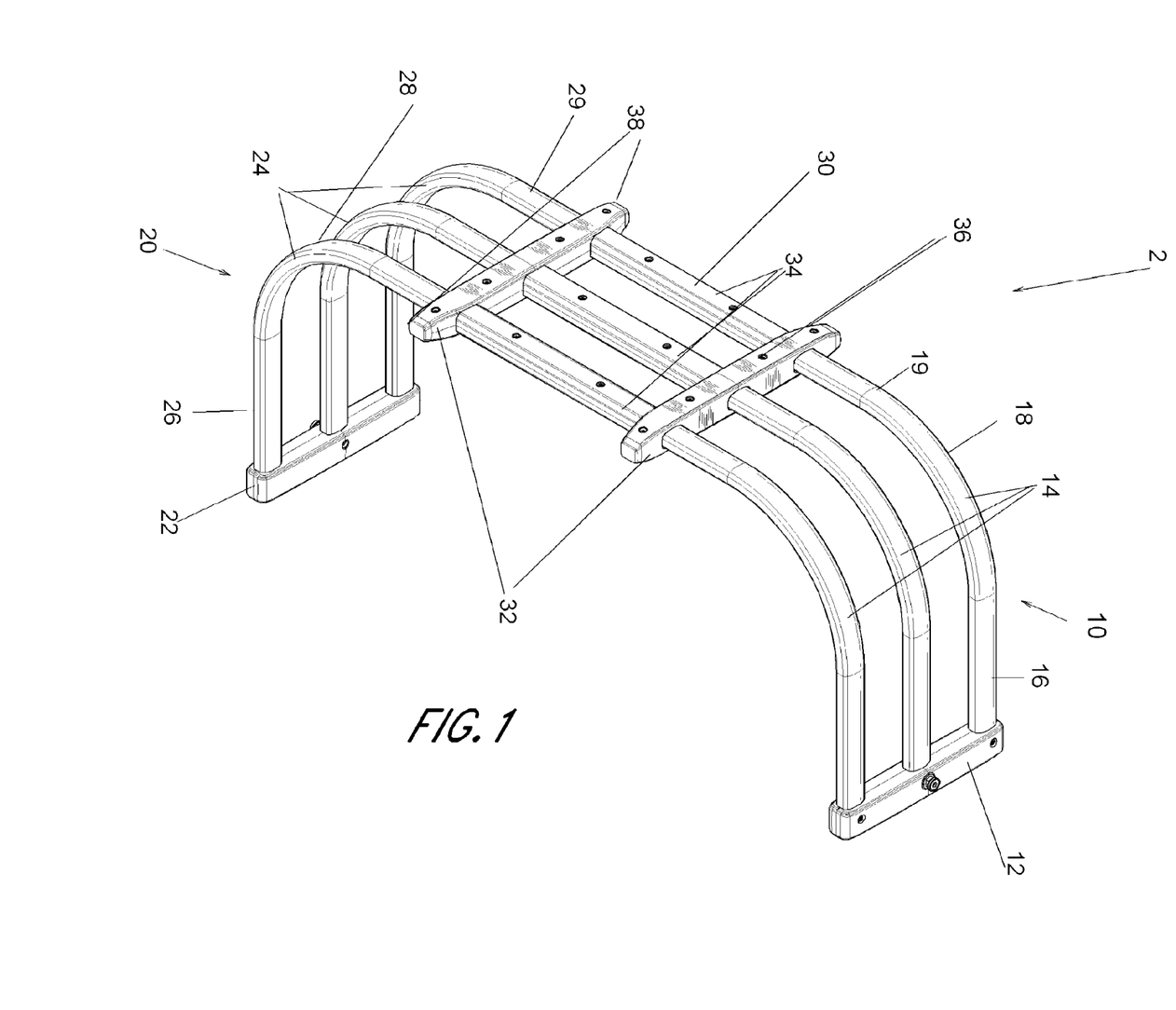
FIG. 1 is a perspective view of one embodiment of vehicle tailgate enclosure.
Figure 2:
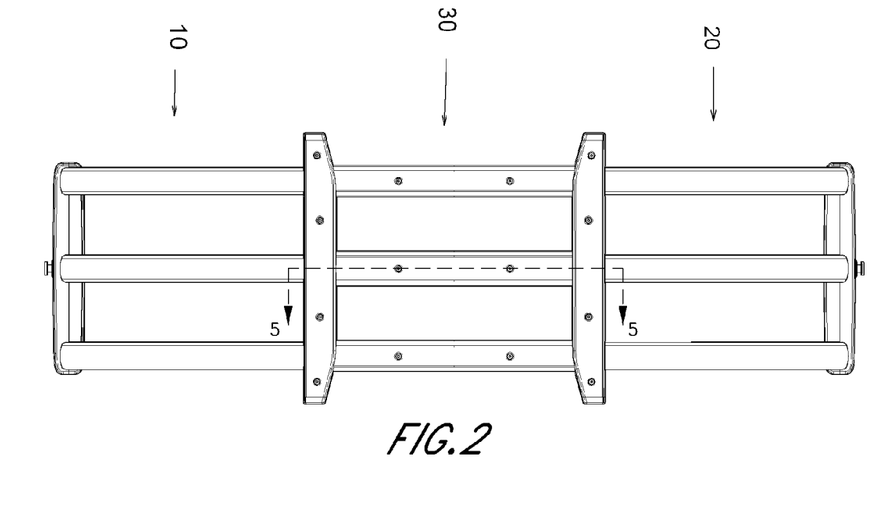
FIG. 2 is a rear view of the vehicle tailgate enclosure of FIG. 1.
Figure 3:
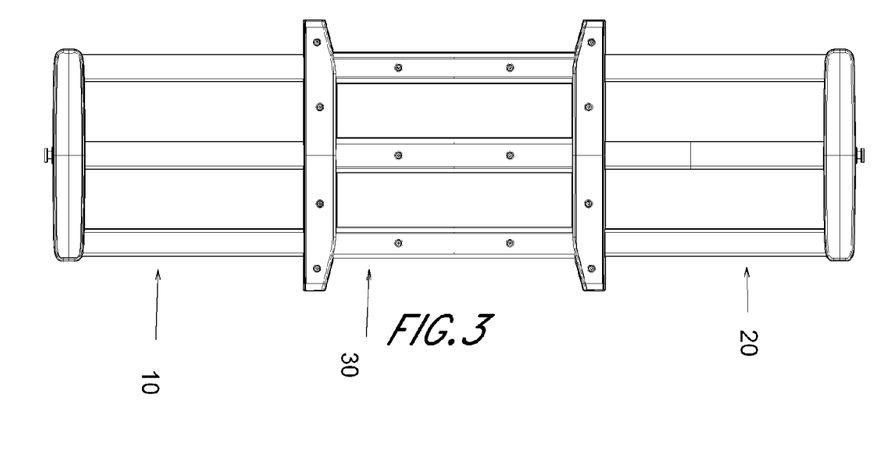
FIG. 3 is a front view of the vehicle tailgate enclosure of FIG. 1.
Figure 4:
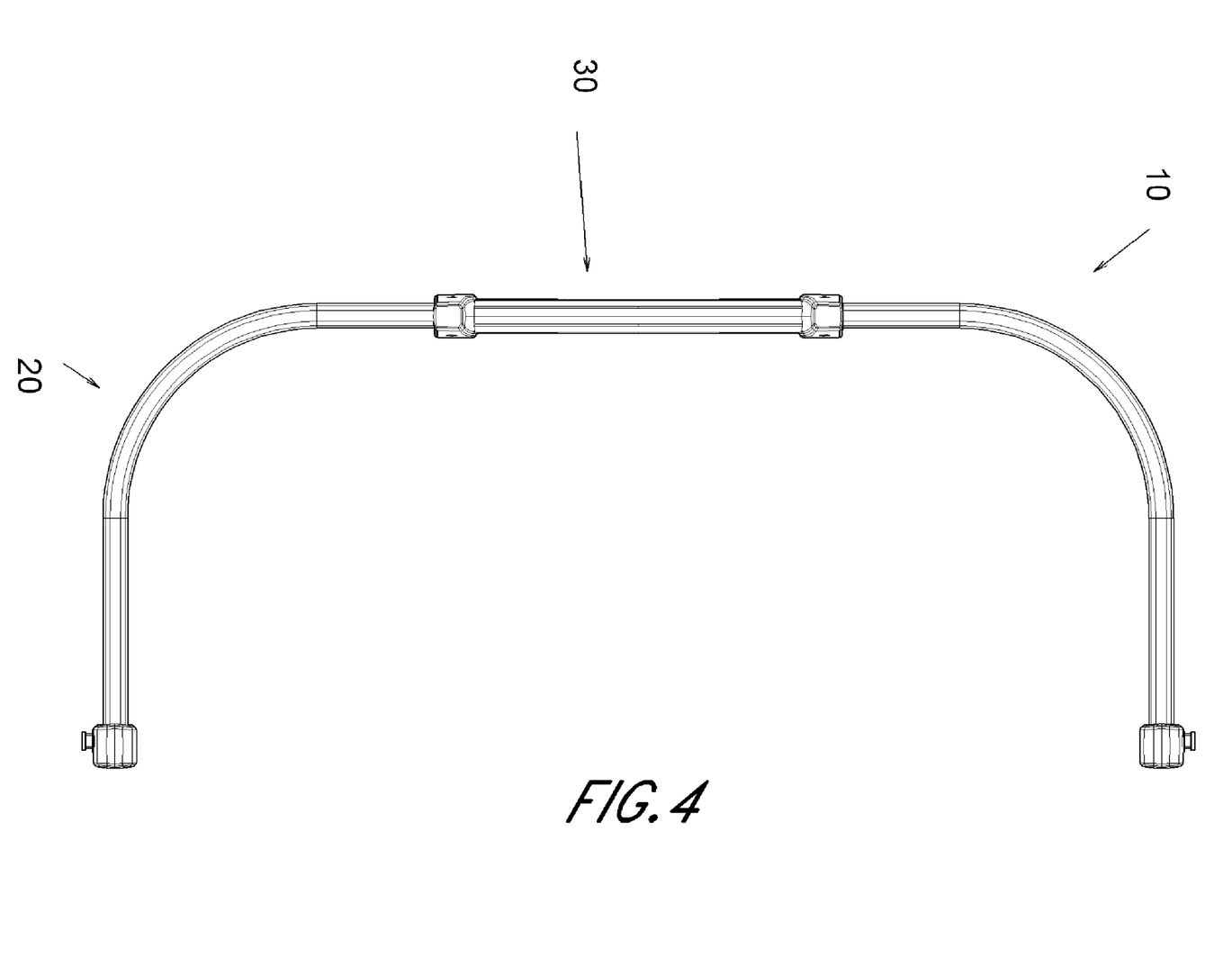
FIG. 4 is a top view of the vehicle tailgate enclosure of FIG. 1.

With reference to FIGS. 1-7 one embodiment of vehicle tailgate enclosure 2 is illustrated. The tailgate enclosure 2 can be configured to coupled to a bed of a vehicle such as a pick up truck having a first side wall, a second side wall, a cargo floor, and a tailgate. In some embodiments, the tailgate enclosure 2 can be rotatably coupled to a vehicle bed and define a first position in which the tailgate enclosure is positioned substantially over the tailgate in an open position such that the tailgate enclosure defines an extended cargo area. The tailgate enclosure 2 can define a second position in which the tailgate enclosure is positioned substantially over the cargo floor to define a partitioned cargo area. FIG. 1 illustrates a perspective view of the vehicle tailgate enclosure 2. In the illustrated embodiment, the tailgate enclosure 2 comprises a first side panel 10, a second side panel 20, and a center panel 30 extending between the first side panel 10 and second side panel 20.

Side Panels

With reference to FIG. 1, in the illustrated embodiment, the first and second side panels 10, 20 each comprise an endcap 12, 22, and a plurality of beams 14, 24. In some embodiment, the endcaps 12, 22 can be configured to couple directly to sidewalls of the vehicle bed. In other embodiments, the endcaps 12, 22 can be configured to couple to a latch positioned on the sidewalls of the vehicle bed. In various embodiments, the coupling between the endcaps 12, 22 and the vehicle bed can be rotatable, while in other embodiments, the coupling can be rotationally fixed.

With continued reference to FIG. 1, in the illustrated embodiments, each of the beams 14, 24 comprises a generally rectangular tubular member having rounded corners. In other embodiments, the beams 14, 24 can comprise other types of members such as generally cylindrical tubular members, square tubes, or members having oval-shaped cross-sections. Advantageously, squared tubes such as the illustrated beams 14, 24 can be relatively easily retained within a housing, as relatively flat side surfaces can be clamped by the housing. Also advantageously, it can be desirable to have rounded tubular members with rounded edges to facilitate gripping and movement of the tailgate enclosure by one of the beams 14, 24.

In some embodiments, the beams 14, 24 comprise a metallic material. Desirably, the beams 14, 24 can be formed of an aluminum composition such as aluminum or an aluminum alloy. Advantageously, aluminum materials can have relatively high strength and low weight characteristics. In other embodiments, the beams 14, 24 can comprise other metallic compositions or alloys, or non-metallic compositions, such as plastic or composite materials.

With reference to FIG. 1, in the illustrated embodiment, the first and second side panels 10, 20 each comprise three beams 14, 24. Desirably, these beams 14, 24 are sized and spaced to span approximately a height of the sidewalls of a vehicle bed and to prevent passage of relatively large objects between the beams 14, 24, thus providing a substantial enclosure for an extended vehicle bed when the tailgate enclosure is in the first position. In other embodiments, the side panels 10, 20 of the tailgate enclosure 2 can each have more or fewer than three beams 14, 24, such as, for example two or four or more beams 14, 24.

With reference to FIG. 1, each of the beams 14, 24 can include a bed extending portion 16, 26 in which, when positioned in a vehicle bed, the bed extending portion 16, 26 is substantially parallel to the sidewalls of the bed. As illustrated, each of the beams 14, 24 can also include a bend portion 18, 28, and an enclosure portion 19, 29. In the illustrated embodiments, the bend portion 18, 28 comprises a radiused curve of approximately ninety degrees, although in other embodiments, other curve amounts and geometries are possible. The enclosure portion 19, 29 can extend from the curved portion 18, 29 to the center panel 30 of the tailgate enclosure 2.

Center Panel

With continued reference to FIG. 1, a center panel 30 extends between the first side panel 10 and the second side panel 20 of the tailgate enclosure 2. In the illustrated embodiment, the center panel 30 comprises two uprights 32 extending transversely to the beams 14, 24 of the side panels 10, 20. The uprights 32 each comprise stops 38 that can be composed of a rubber or polymeric material to cushion the tailgate enclosure 2 when it is rested on the cargo floor or tailgate of the vehicle bed. The center panel further comprises a plurality of beams 36 extending generally parallel to the enclosure portions 19, 29 of the beams 14, 24 of the side panels 10, 20.

In some embodiments, the center panel 30 can be formed of a material that is different from the material of the side panels 10, 20. For example, in some embodiments, as discussed in further detail below, the center panel 30 can be formed of a molded thermoplastic material. In other embodiments, the center panel 30 can be formed of a polymeric material, a composite material such as a carbon fiber composite or a glass fiber composite, or a metallic material. In some embodiments, desirably the use of a plastic material in the center panel 30 can reduce the total weight of a vehicle tailgate enclosure as compared to a similar tailgate enclosure that is comprised substantially entirely of metallic materials.

In some embodiments, the center panel 30 can be configured to be removably coupled to the side panels 10, 20. Advantageously, this removable coupling allows the tailgate enclosure 2 to be stored in a relatively small shipping box, thus facilitating distribution of a tailgate enclosure 2 in an unassembled state.

As discussed below, the center panel 30 can be configured to retain the side panels such that the assembly of the center panel 30 and side panels 10, 20 allows an adjustable width of the end caps 12, 22 of the side panels 10, 20 relative to one another. Thus, desirably one tailgate enclosure 2 can be adapted to fit vehicle beds having various different widths. In some embodiments, the tailgate enclosure 2 can have a width adjustment range (that is, the difference between a maximum width of the tailgate enclosure and a minimum width thereof) of approximately 2 inches, while in other embodiments, the width adjustment range can be approximately 4 inches and in still other embodiments, the width adjustment range can be approximately 6 inches.

Figure 5:
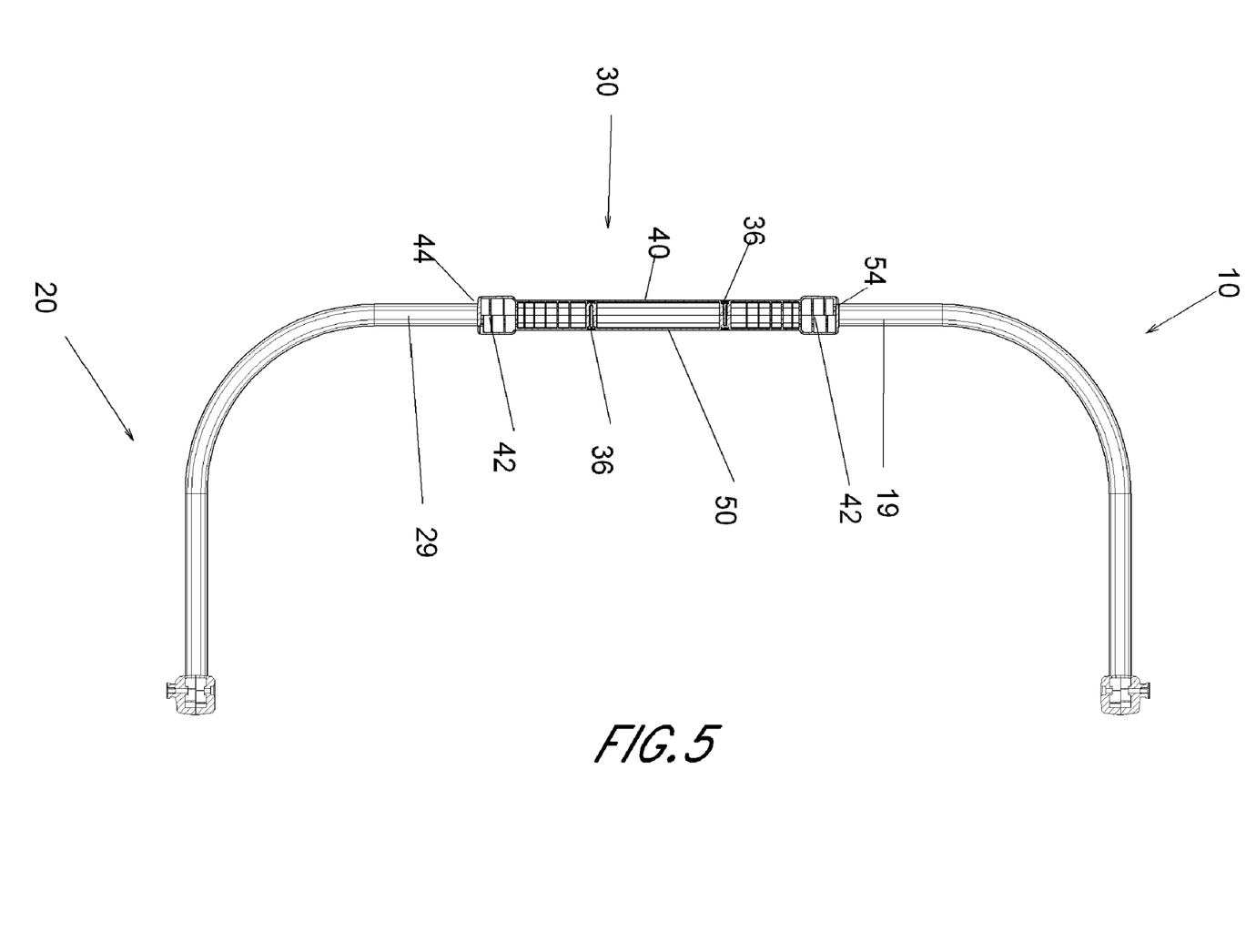
FIG. 5 is a cross-sectional view of the vehicle tailgate enclosure of FIG. 1 taken along line 5-5 of FIG. 2.
Figure 6:
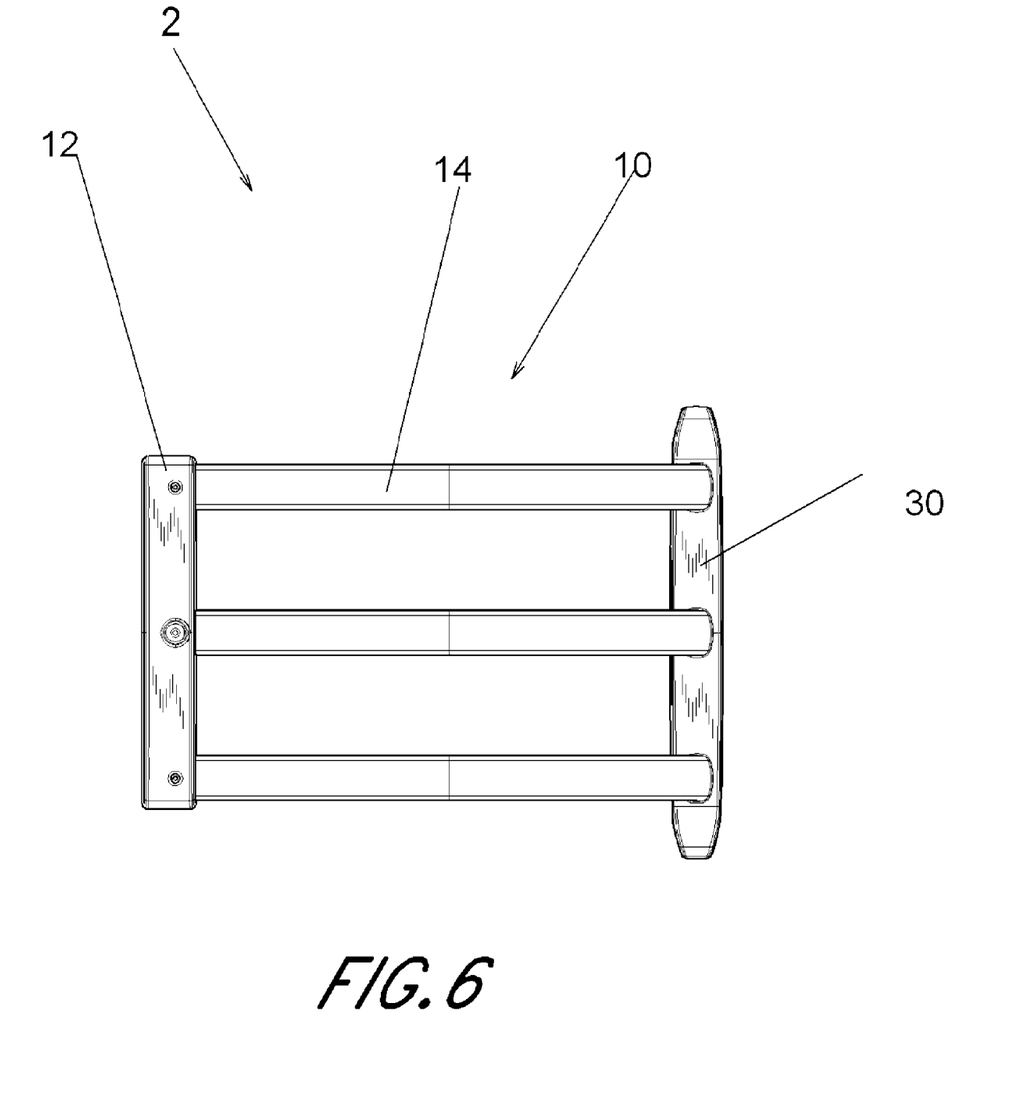
FIG. 6 is a side view of the vehicle tailgate enclosure of FIG. 1.
Figure 7:
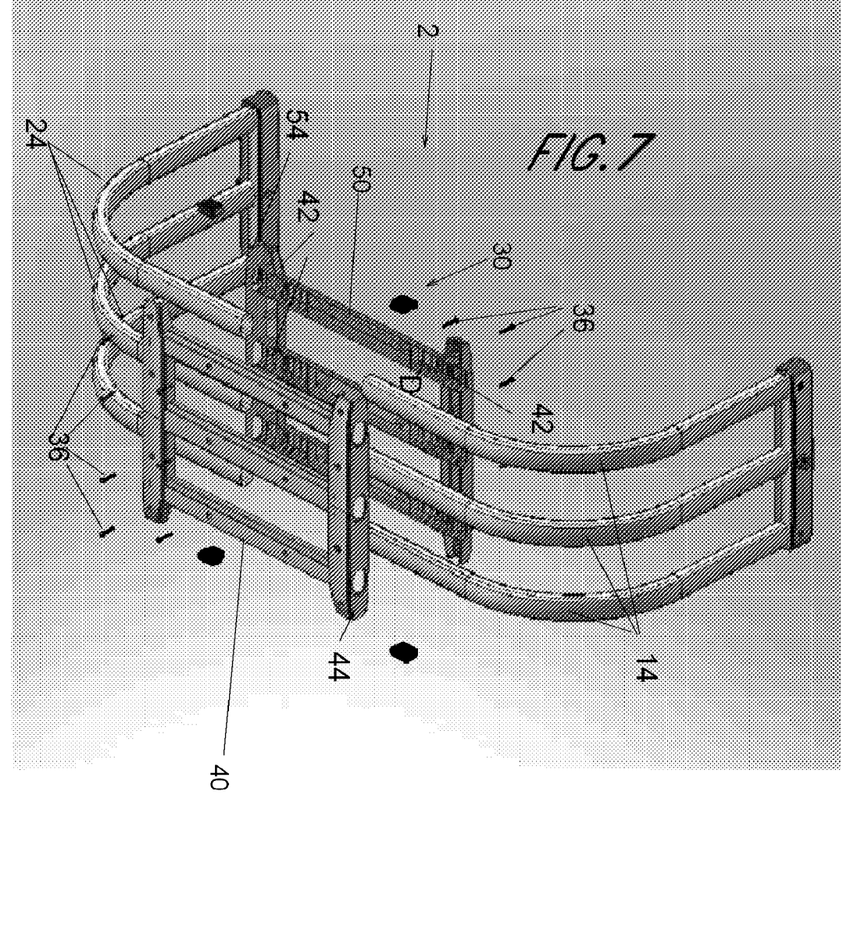
FIG. 7 is an exploded assembly view of the vehicle tailgate enclosure of FIG. 1.
Figure 8:
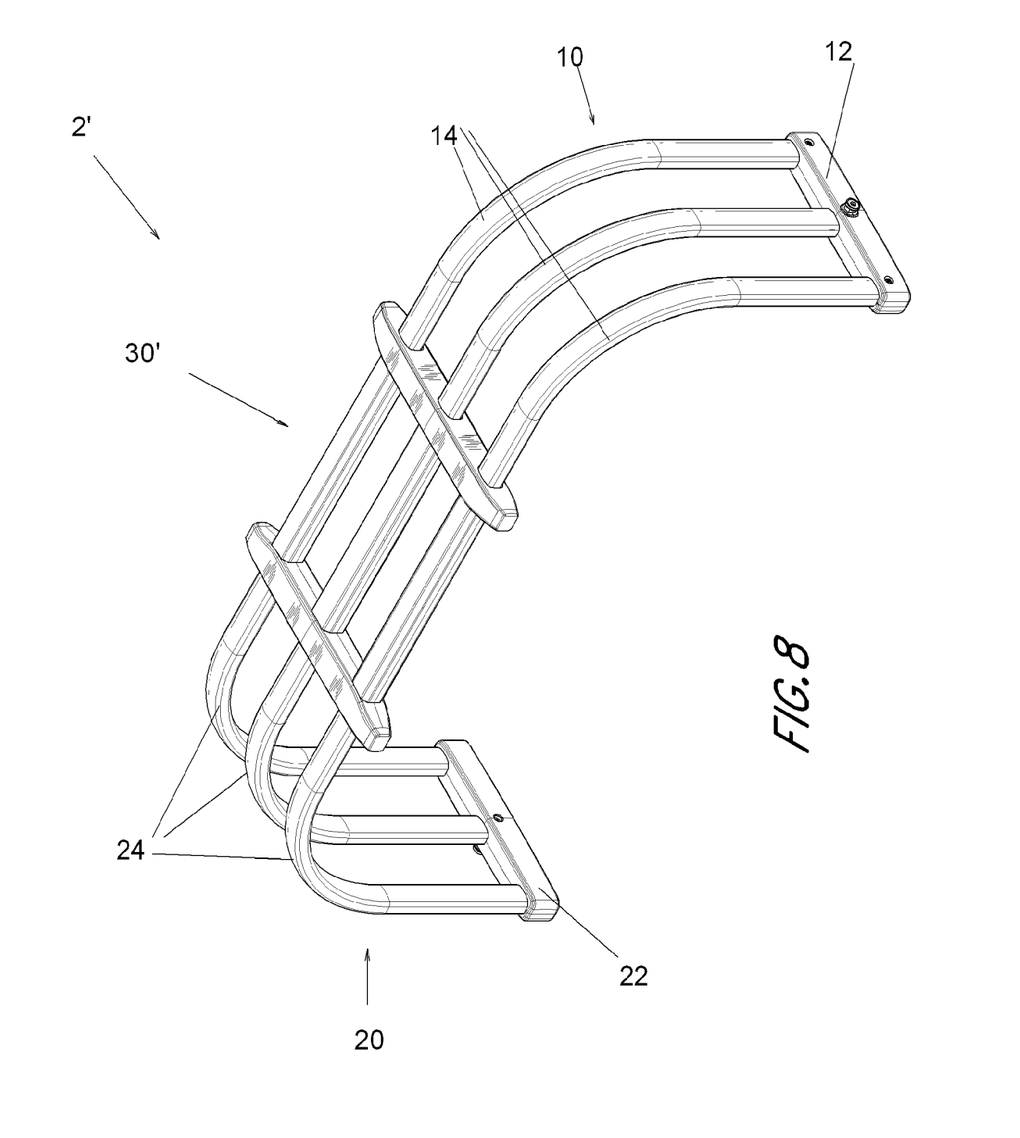
FIG. 8 is a perspective view of another embodiment of vehicle tailgate enclosure.
Figure 9:
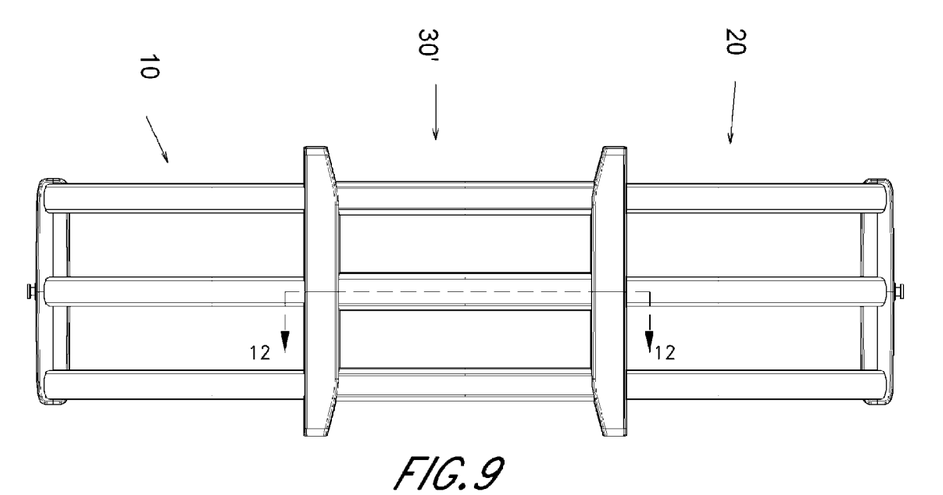
FIG. 9 is a rear view of the vehicle tailgate enclosure of FIG. 8.
Figure 10:
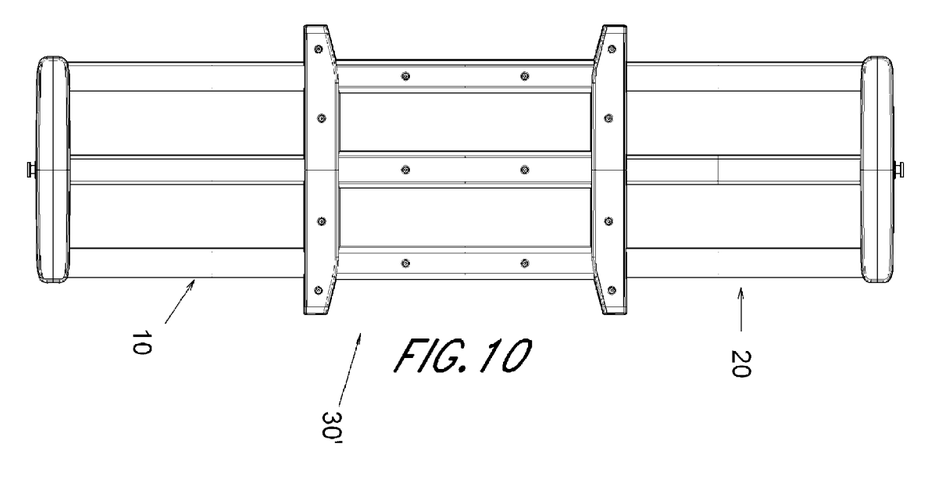
FIG. 10 is a front view of the vehicle tailgate enclosure of FIG. 8.
Figure 11:
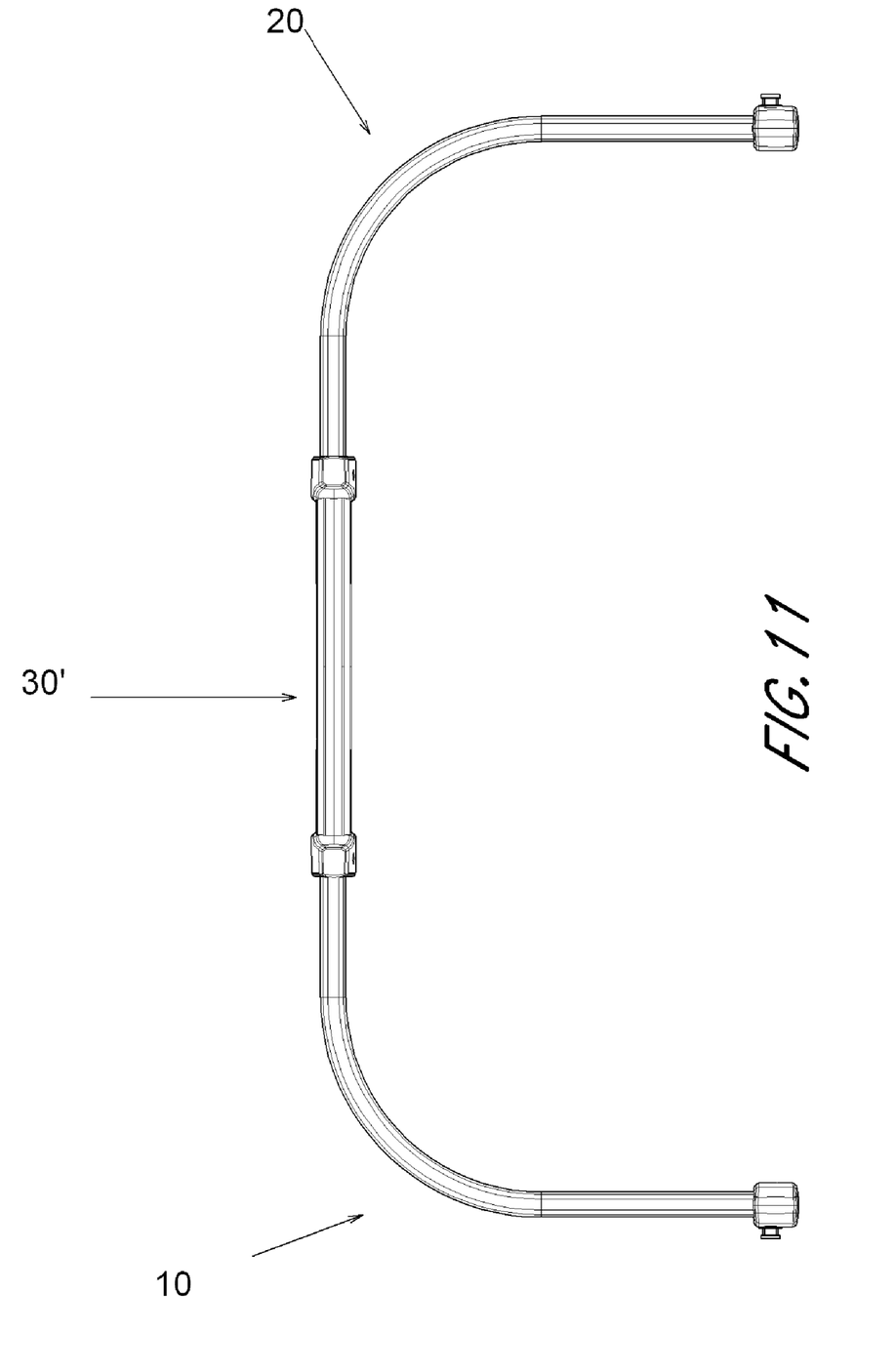
FIG. 11 is a top view of the vehicle tailgate enclosure of FIG. 8.

With respect to FIGS. 2-4 and 6, various views of the tailgate enclosure 2 are illustrated. FIGS. 5 and 7 illustrate a cross sectional and exploded assembly view of the tailgate enclosure 2 showing the assembly of one embodiment of center panel 30. In the illustrated embodiment the center panel 30 comprises a first portion 40 and a second portion 50 coupled with fasteners 36. In the illustrated embodiment, the first and second portions 40, 50 are substantially identically configured, each comprising a portion of the uprights 32 and beams 38. When the portions 40, 50 are positioned in opposite orientations (that is, the first portion 40 is rotated 180 degrees with respect to the second portion), the first and second portions can be coupled with fasteners 36 such as screws. In other embodiments, other fastener types can be used to couple the first portion 40 to the second portion 50. In still other embodiments, the first and second portions 40, 50 can be configured with mating interference surfaces such that they snap together. As illustrated, the first portion defines a first lateral outer surface 44 of the center panel 30, and the second sidewall defines a second lateral outer surface 54 of the center panel 30. Advantageously, a center portion formed of two substantially identical portions 40, 50 can reduce manufacturing costs as a single tooling setup can be used to create both portions 40, 50. It can also advantageously reduce inventory costs as a single part can be maintained in inventory. It can also facilitate ease of assembly of the center panel 30.

With continued reference to FIGS. 5 and 7, coupling the first portion 40 to the second portion 50 forms the center panel 30. The center panel 30 comprises a plurality of recesses 42 each configured to receive a beam 14, 24 of the first and second side panels 10, 20. When the first and second portions 40, 50 are coupled, the beams 14, 24 are retained in the recesses 42. Width adjustment of the tailgate enclosure 2 can be provided by a depth, D, of the recesses 42. Accordingly, to adjust the width of the tailgate enclosure, the beams 14, 24 can be advanced varying amounts into the recesses 42 such that the end caps 12, 22 are a desired width apart, then retained at a desired width by securely coupling the first portion 40 to the second portion 50. In some embodiments, the center panel 30 can include a plurality of lock or set screws to retain the beams 14, 24 at a desired depth in the center panel 30.

Advantageously, in the illustrated embodiment, the two portion 40, 50 coupling of the center panel 30 provides a relatively rigid center panel 30 that resists twisting of one upright 32 relative to another, while having a low total parts count for a tailgate enclosure 2. In other embodiments, the center panel 30 can be formed of more than two portions, or can be formed of a single, unitary panel.

Center Panel Comprising Two Dissimilar Portions

With reference to FIGS. 8-14, another embodiment of tailgate enclosure 2' is illustrated. The illustrated tailgate enclosure 2' comprises first and second side panels 10, 20 substantially as described above with respect to FIGS. 1-7. Tailgate enclosure further comprises a center panel 30'.

Figure 12:
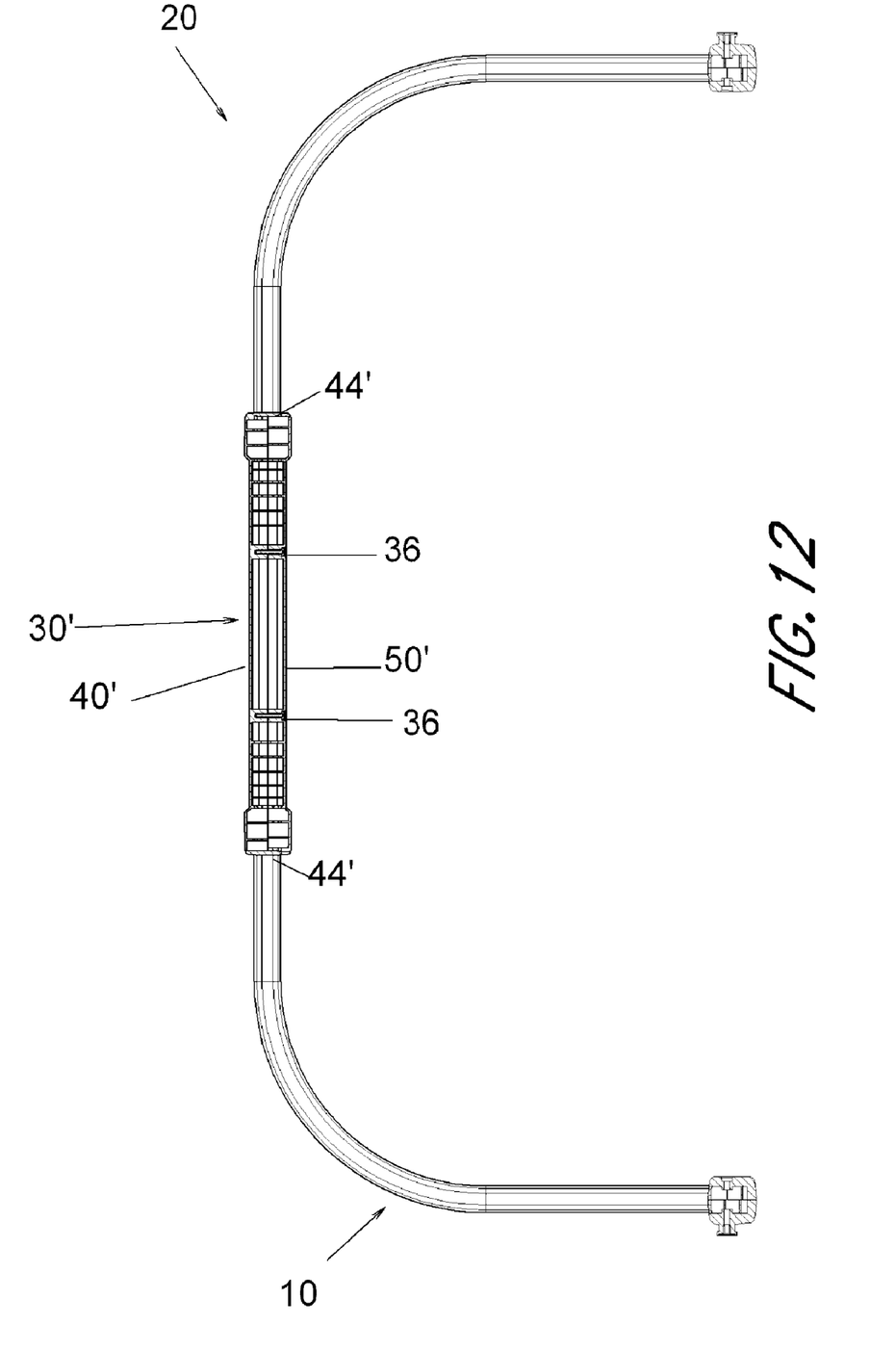
FIG. 12 is a cross-sectional view of the vehicle tailgate enclosure of FIG. 8 taken along line 12-12 of FIG. 2.
Figure 13:
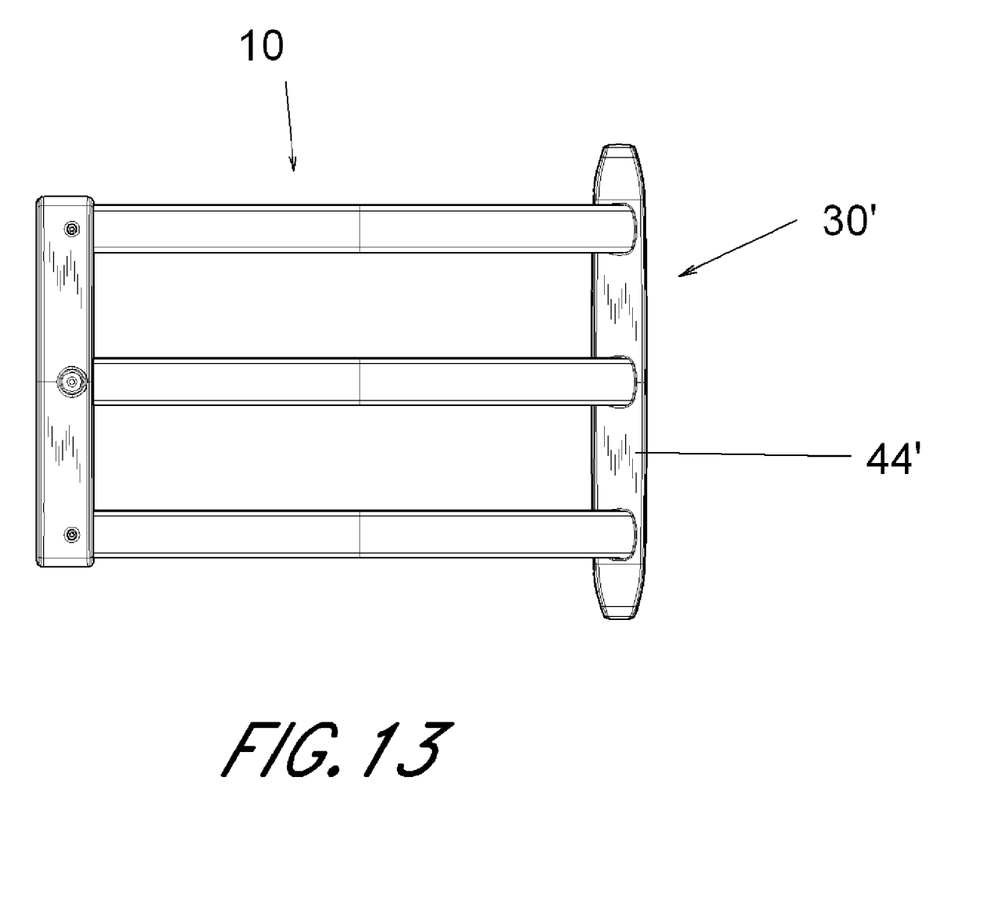
FIG. 13 is a side view of the vehicle tailgate enclosure of FIG. 8.
Figure 14:
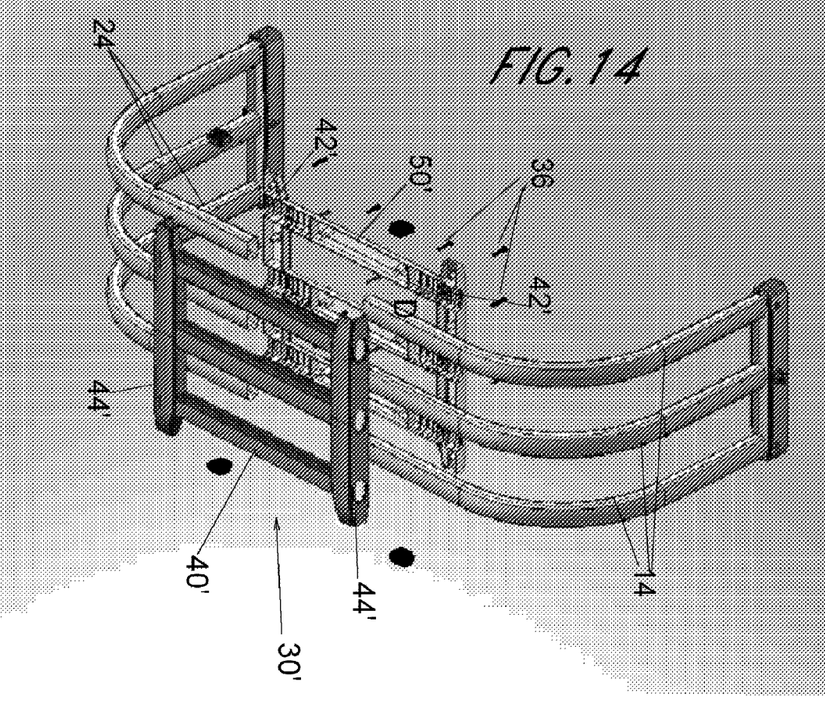
FIG. 14 is an exploded assembly view of the vehicle tailgate enclosure of FIG. 8.

FIGS. 12 and 14 illustrate a cross sectional and exploded assembly view of the tailgate enclosure 2' showing the assembly of one embodiment of center panel 30'. In the illustrated embodiment the center panel 30' comprises a first portion 40' and a second portion 50' coupled with fasteners 36. In the illustrated embodiment, the first and second portions 40', 50' are not substantially identically configured. Rather, the first portion 40' defines an outer portion defining two lateral outer surfaces 44'. When the second portion 50' is positioned within the lateral outer surfaces 44', the first and second portions 40', 50' can be coupled with fasteners 36 such as screws. In the illustrated embodiment, the second portion 50' can include holes for the fasteners, while the first portion 40' has threaded inserts to receive the fasteners 36. Accordingly, in some embodiments, no fasteners or fastener holes are visible from one side of the tailgate enclosure 2', thus presenting a sleek look in certain orientations. In other embodiments, other fastener types can be used to couple the first portion 40' to the second portion 50'. In still other embodiments, the first and second portions 40', 50' can be configured with mating interference surfaces such that they snap together.

With continued reference to FIGS. 12 and 14, coupling the first portion 40' to the second portion 50' forms the center panel 30'. The center panel comprises a plurality of recesses 42' each configured to receive a beam 14, 24 of the first and second side panels 10, 20. When the first and second portions 40', 50' are coupled, the beams 14, 24 are retained in the recesses 42'. In some embodiments, the center panel 30' can include a plurality of lock or set screws to retain the beams 14, 24 in the center panel 30'.

Method of Assembly

Advantageously, vehicle tailgate enclosures 2, 2' described herein can be easily transported in relatively small shipping packages such as boxes. Accordingly, shipping costs should be relatively low as compared to pre-assembled tailgate enclosures. Additionally, assembly can be relatively quick and easy to perform by an end-user, a distributor, or a retailer. Further savings can be obtained with the tailgate enclosures 2, 2' described herein as the vehicle tailgate enclosures 2, 2' can be adjustable in width, thereby reducing the need to maintain inventory of separate make and model specific vehicle tailgate enclosures.

For example, the vehicle tailgate enclosures 2, 2' can be easily assembled using a method comprising assembling a center panel assembling a center panel 30, 30' of the vehicle tailgate enclosure 2, 2', advancing a plurality of beams 14 of a first side panel 10 into a corresponding plurality of recesses 42, 42' in the center panel 30, advancing a plurality of beams 24 of a second side panel 20 into a corresponding plurality of recesses 42, 42' in the center panel 30, 30' and restraining the beams 14, 24 of the first side panel 10 and the second side panel 20 with respect to the center panel 30, 30'. Advantageously, in some embodiments, the entire assembly method can be performed with a single tool, used to couple the first portion 40, 40' of the center panel 30, 30' to the second portion 50, 50' to form the housing 30, 30'.

Although the cargo tailgate enclosure 2, 2' has been disclosed in the context of certain preferred embodiments and examples, it will be understood by those skilled in the art that the cargo tailgate enclosure extends beyond the specifically disclosed embodiments to other alternative embodiments and/or users of the invention and obvious modifications and equivalent thereof. In particular, while the present cargo tailgate enclosure has been described in the context of a particularly preferred embodiment, a skilled artisan will appreciate in view of the present disclosure that certain advantages, features and aspects of the cargo tailgate enclosure may be realized in a variety of other applications, many of which have been noted above. Additionally, it is contemplated that various aspects and features of the invention described can be practiced separately, combined together, or substituted for one another, and that a variety of combinations and sub-combinations of the features and aspects can be made and still fall within the scope of the inventions. Thus, it is intended that the scope of the present invention herein disclosed, should not be limited by the particular disclosed embodiments described above but should be determined only by a fair reading of the claims.

What is claimed is:

1. A vehicle tailgate enclosure comprising:
   a first side section comprising a plurality of beams;
   a second side section comprising a plurality of beams; and
   a center section configured to extend between the first side section and the second side section, the center section comprising:
      a first portion defining at least a portion of a first upright and a portion of a plurality of cross-beams; and
      a second portion configured to couple to the first portion, said second portion defining at least a portion of a second upright and a portion of a plurality of cross-beams;
      wherein the coupled said first portion and said second portion define a plurality of recesses, each recess configured to receive one of the plurality of beams of the first and the second side sections, wherein the first portion of the center section is shaped and configured substantially identically to the second portion of the center section.

2. The vehicle tailgate enclosure of claim 1, wherein the first portion of the center section defines two laterally outer surfaces of the center section and the second portion of the center section is shaped and configured to fit within the two outer surfaces.

3. The vehicle tailgate enclosure of claim 1, wherein the center section is comprised of a thermoplastic material.

4. The vehicle tailgate enclosure of claim 1, wherein the first portion of the center section is configured to couple to the second portion of the center section with at least one fastener.

5. The vehicle tailgate enclosure of claim 1, wherein said first upright defines at least one opening sized and shaped to receive one of said plurality of beams of said first side section and wherein said second upright defines at least one opening sized and shaped to receive one of said plurality of beams of said second side section.

* * * * *